March 17, 1959 R. THEILE 2,878,416

TELEVISION CAMERA TUBES

Filed Aug. 10, 1953

Inventor
RICHARD THEILE
By
Holcombe, Wetherill & Brisebois
Attorney

United States Patent Office 2,878,416
Patented Mar. 17, 1959

2,878,416

TELEVISION CAMERA TUBES

Richard Theile, Marburg an der Lahn, Germany, assignor to Pye Limited, Cambridge, England, a British company Application August 10, 1953, Serial No. 373,371

7 Claims. (Cl. 315—10)

This invention relates to television apparatus comprising a television pick-up tube of a low-velocity beam scanning type, i. e., in which the electrons of an electron beam scanned over a target in order to generate video signals are caused to approach the target at low velocity (approaching zero velocity) so as to avoid any appreciable liberation of secondary electrons from the target. Pick-up tubes of this type which have been constructed and proved to be practicable up to the present utilise a long magnetic field produced by a long coil extending over the full length of the tube envelope for directing the beam electrons along paths normal to the target surface so that they arrive at the target with substantially normal incidence, which has been found to be an essential requirement of a low-velocity scanning system. The use of such a long coil, while giving good results, has several disadvantages. The coil is heavy and occupies considerable space. It is an expensive component of a television camera and requires a steady, well-regulated energising current. It involves a heavy power consumption not only for itself but also for the beam deflecting coils usually employed therewith, and the heavy power consumption causes undesired heat generation. Tubes utilising such a long coil are not advantageous for employment in compact television camera units and especially for industrial applications where compact and inexpensive television equipment is a practical necessity if the anticipated advantages of the uses of television for industrial purposes are to be realised.

The use of purely electrostatic means for low-velocity scanning offers the prospect of avoiding the disadvantages of the long coil, and various proposals to this end have already been made, but so far as I am aware none of these has been made to work successfully and no practical tube employing solely electrostatic focusing means with low-velocity scanning is as yet available to users in this art.

The invention thus relates more specifically to television apparatus incorporating a television pick-up tube that comprises an electron gun for developing a beam of low-velocity scanning electrons, electrostatic focusing means for focusing said electrons on to a plate-like target and deflecting means for causing the beam to scan the said target.

According to the invention there is provided television apparatus of this kind in which electron-accelerating means are so located in the tube as to accelerate the electrons of the beam after they have been subjected to the scanning deflections, the acceleration being of the order of several thousand volts, and the beam electrons subsequently being decelerated to substantially zero in the close vicinity of the target, whereby the beam is caused to approach the target at substantially normal incidence throughout its movement.

The invention also provides television apparatus as defined in the last preceding paragraph in which the target comprises a photo-conductive layer facing the gun and a transparent signal plate on its opposite side, in close contact with said layer and through which a light image may be projected onto the photo-conductive layer.

The advantage of such an arrangement is that the diameter of the elementary beam pencils is small and the path of the beam electrons where they are decelerated is reduced to a short distance from the target. The circle of confusion, therefore, is reduced in the electron-imaging process and the effect of lens aberrations is small, as proved by experiment. The arrangement described has also the advantage that the electrons, due to the high accelerating field interposed between the electron gun and the target, travel close to the centre line of the tube, only diverging to a small extent just in front of the target in the deceleration process. As a result of this, the picture definition is improved.

The application of a high intermediate acceleration causes some geometrical (pin-cushion) distortion in the picture which, as a further feature of the invention, can be compensated by correspondingly pre-distorting the scan, either by suitable modulation of the scanning waveforms or by superimposing static correcting magnetic fields on the tube. As an example of the latter, a rectangular frame of four permanent magnets or D. C.-energized electromagnets may be arranged around the tube for correcting the distortion.

In order that the invention may be more readily understood, reference will now be made to the accompanying drawings which show one embodiment thereof by way of example, and in which.

Figure 1:
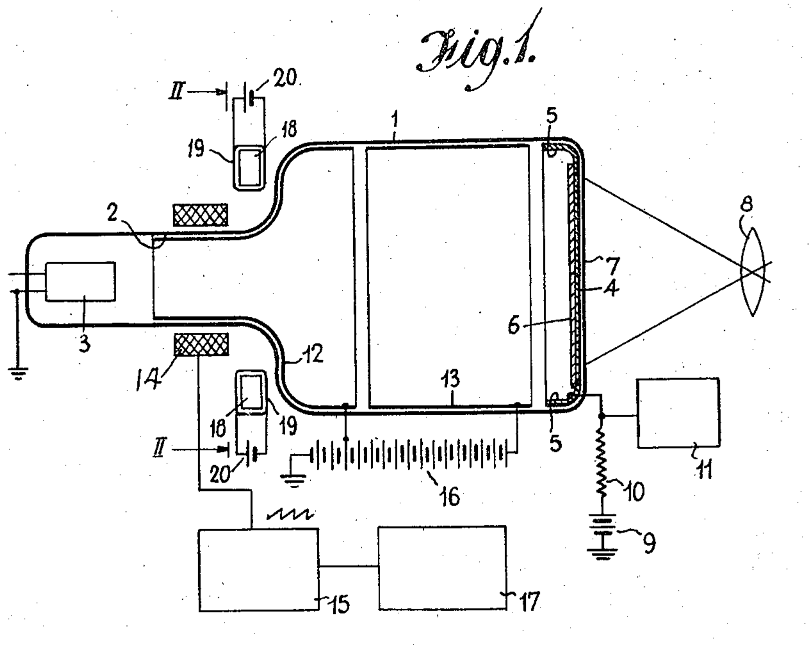
Fig. 1 shows a longitudinal section through the apparatus.

In the drawing the tube comprises an evacuated envelope 1 provided at one end with a constricted neck portion 2 with an electron gun 3 of any known kind.

At the other end of the tube is an electrode 4 which is bent around the walls of the tube at 5 into a dished shape as shown. This electrode 4 is transparent and forms the signal plate for the target.

In front of the electrode 4, i. e., facing the scanning gun 3, is a layer 6 of any suitable photoconductive material such as amorphous selenium, cadmium oxide or antimony trisulphide for example. This layer 6 must be in close contact with the signal plate electrode 4 and may be applied to the front surface of the electrode by vapour deposition. Reference numeral 7 denotes the end wall of the tube.

The photo-conductive layer 6 has focussed on to it light from the scene to be televised by means of an optical system schematically illustrated at 8, and is rendered selectively conductive over its area in accordance with the point-by-point brightness of the scene. The transparent electrode 4 through which the light passes to the layer 6 forms the signal plate of the tube and may be biassed with a low positive potential, e. g., from 1 to 100 v. from a source 9, although this source may be omitted and the electrode unbiassed. The output is taken off across resistor 10 and may be amplified by an amplifier schematically shown at 11.

The scanning electrons from gun 3 are focussed onto the layer 6 by an electron lens arrangement comprising electrodes 12 and 13 and this focussing is effected after deflection by the deflection coils 14 which are fed by appropriate deflection potentials in known manner from a suitable waveform generator device schematically illustrated at 15. Such devices are well-known in the art and need not be illustrated here.

The electrodes 12 and 13 are energized from the potential source 16, the electrode 13 being held at a potential considerably higher than that of electrode 12; said potential for example may be several thousand volts, e. g., 5,000 volts although potentials as low as 1000 volts have been successfully tried.

Since the electrode 13 has a very high potential, it acts as an accelerating electrode of considerable power and before the accelerated electrons impinge on the photo-conductive layer 6 they are decelerated to zero potential or substantially so due to the fact that the target is at zero or only a relatively low positive potential. In this way the electrons scan the layer 6 of the target substantially orthogonally, and the diameter of the elementary beam pencils is small. Also the path of the beam electrons where they are decelerated is reduced to a short distance from the target.

Figure 2:
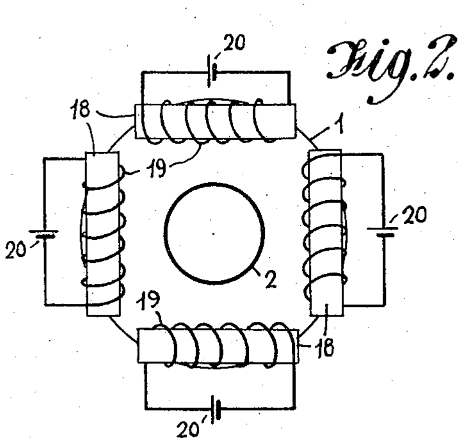
Fig. 2 shows a section along the line II—II of Fig. 1.

To compensate for the geometrical distortion of the picture inherently due to the high intermediate acceleration of the electrons of the scanning beam, means are provided for predistorting the scan. This can be effected by applying a suitable modulating waveform from a waveform generator 17 to the existing deflection waveform generator 15 for the scanning coils 14 or, alternatively, a frame of four magnets 18 may be disposed round the tube as shown more clearly in Fig. 2. The magnets may be electromagnets as shown with coils 19 energised by D. C. sources 20, or they may be permanent magnets if desired. In certain circumstances it may be desirable to use both the modulation generator 17 and the magnet systems 18 simultaneously.

I claim:

1. Television apparatus comprising a television pick-up tube, an electron scanning gun within said tube, a plate-like target within said tube and opposite said electron gun, a first electron-accelerating electrode within said tube between said electron gun and said target, means for energising said first accelerating electrode for producing a low-velocity acceleration of electrons from said gun towards said target, deflecting means located around said first electrode for causing the electrons from said gun to scan said target, a second electron-accelerating electrode within said tube between said first electrode and said target, means for energising said second electrode with a potential of at least one thousand volts, and means for holding said target electrode at a potential considerably lower than the potential of said second accelerating electrode, for example, at a potential of the order of zero to one hundred volts positive.

2. Television apparatus comprising a television pick-up tube, an electron scanning gun within said tube, a plate-like target within said tube, a first electron-accelerating electrode within said tube and located between said gun and said target, means for applying a potential to said first accelerating electrode to produce a rain of low-velocity electrons for impingement upon said target surface, deflecting means located externally of said tube around said first electrode for causing said electrons to scan said target, a second electron-accelerating electrode located in said tube between said first accelerating electrode and said target, means for energising said second accelerating electrode with a potential of at least one thousand volts, means for decelerating the accelerated electrons to substantially zero volts in the close vicinity of said target, and means for pre-distorting the scan of the electron beam brought about by said deflecting means to compensate for geometrical distortion of said scan occasioned by acceleration of the electron beam by said second accelerating electrode.

3. Television apparatus comprising a television pick-up tube, an electron scanning gun within said tube, a plate-like target within said tube, a first electron-accelerating electrode within said tube and located between said gun and said target, means for applying a potential to said first focussing electrode to produce a rain of low-velocity electrons for impingement upon said target surface, deflecting means located externally of said tube around said first electrode for causing said electrons to scan said target, a second electron accelerating electrode located in said tube between said first accelerating electrode and said target, means for energising said second accelerating electrode with a potential of at least one thousand volts, means for decelerating the accelerated electrons to substantially zero volts in the close vicinity of said target, and magnetic means located adjacent said deflecting means for pre-distorting the scan of the electron beam brought about by said deflecting means to compensate for geometrical distortion of said scan occasioned by acceleration of the electron beam by said second accelerating electrode.

4. Television apparatus comprising a television pick-up tube, an electron scanning gun within said tube, a plate-like target within said tube, a first electron-accelerating electrode within said tube and located between said gun and said target, means for applying a potential to said first focussing electrode to produce a rain of low-velocity electrons for impingement upon said target surface, deflecting means located externally of said tube around said first electrode for causing said electrons to scan said target, a second electron accelerating electrode located in said tube between said first accelerating electrode and said target, means for energising said second accelerating electrode with a potential of at least one thousand volts, means for decelerating the accelerated electrons to substantially zero volts in the closed vicinity of said target, and an electromagnet system located adjacent said deflecting means for pre-distorting the scan of the electron beam brought about by said deflecting means to compensate for geometrical distortion of said scan occasioned by acceleration of the electron beam by said second accelerating electrode.

5. Television apparatus comprising a television pick-up tube, an electron scanning gun within said tube, a plate-like target within said tube, a first electron-accelerating electrode within said tube and located between said gun and said target, means for applying a potential to said first accelerating electrode to produce a rain of low-velocity electrons for impingement upon said target surface, deflecting means located externally of said tube around said first electrode for causing said electrons to scan said target, a second electron-accelerating electrode located in said tube between said first accelerating electrode and said target, means for energising said second accelerating electrode with a potential of at least one thousand volts, means for decelerating the accelerated electrons to substantially zero volts in the close vicinity of said target, and a modulation waveform generator connected to said deflection means for pre-distorting the scan of the electron beam brought about by said deflecting means to compensate for geometrical distortion of said scan occasioned by acceleration of the electron beam by said second accelerating electrode.

6. Television pick-up tube apparatus comprising an envelope having a neck portion, an electron gun in said neck portion, a target at the opposite end of said envelope, said target comprising a transparent signal electrode and a photo-conductive layer, said photo-conductive layer facing said electron gun, a first accelerating electrode between said gun and said target, a second accelerating electrode between said first accelerating electrode and said target, beam deflection means located externally of said tube and around said neck, and a magnet system located around said neck.

7. Television pick-up tube apparatus comprising an envelope having a neck portion, an electron gun in said neck, a target at the opposite end of said envelope, said target comprising a transparent signal electrode and a photo-conductive layer, said photo-conductive layer facing said electron gun, a first accelerating electrode between said gun and said target, a second accelerating electrode between said first accelerating electrode and said target, beam deflection means located externally of said tube and around said neck, and an electromagnet system comprising four electromagnets arranged mutually at 90° around said neck.

References Cited in the file of this patent

UNITED STATES PATENTS

| | | |
|---|---|---|
| 2,240,186 | Iams | Apr. 29, 1941 |
| 2,248,977 | Flory et al. | July 15, 1941 |
| 2,503,949 | Jensen et al. | Apr. 11, 1950 |
| 2,527,652 | Pierce | Oct. 31, 1950 |
| 2,575,477 | Weimer | Nov. 20, 1951 |
| 2,622,219 | Schagen | Dec. 16, 1952 |
| 2,637,002 | Rose | Apr. 28, 1953 |
| 2,740,918 | James et al. | Apr. 3, 1956 |

OTHER REFERENCES

"Video Handbook," 1949, second printing, pages 74 and 75, William F. Boyce, Publisher.